US 9,060,053 B2

(12) United States Patent
Rados et al.

(10) Patent No.: US 9,060,053 B2
(45) Date of Patent: Jun. 16, 2015

(54) MITIGATING DENIAL OF SERVICE ATTACKS ON CALL CENTERS

(75) Inventors: Steven R. Rados, Danville, CA (US); Lin Sun, San Ramon, CA (US); Steven L. Spak, Columbia, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 309 days.

(21) Appl. No.: 13/401,290

(22) Filed: Feb. 21, 2012

(65) Prior Publication Data
US 2013/0216027 A1 Aug. 22, 2013

(51) Int. Cl.
*H04M 1/24* (2006.01)
*H04M 3/22* (2006.01)
*H04M 3/51* (2006.01)
*H04M 7/00* (2006.01)
*H04L 29/06* (2006.01)

(52) U.S. Cl.
CPC *H04M 3/22* (2013.01); *H04M 3/51* (2013.01); *H04M 7/006* (2013.01); *H04L 63/08* (2013.01)

(58) Field of Classification Search
USPC ............. 379/32.01, 100.05, 133, 265.06, 379/266.04, 201.1, 377, 207.15, 210.02
See application file for complete search history.

(56) References Cited

U.S. PATENT DOCUMENTS

| | | | | |
|---|---|---|---|---|
| 8,085,915 | B2* | 12/2011 | Reumann et al. | 379/142.05 |
| 8,245,277 | B2* | 8/2012 | Lazar et al. | 726/2 |
| 2002/0126828 | A1* | 9/2002 | Kamen | 379/265.01 |
| 2007/0165821 | A1* | 7/2007 | Altberg et al. | 379/210.02 |

* cited by examiner

*Primary Examiner* — Yosef K Laekemariam

(57) ABSTRACT

A device receives, from a user device, a call destined for a call center, and provides an audio CAPTCHA (Completely Automated Public Turing test to Tell Computer and Humans Apart) to the user device in response to the call. The device also receives, from the user device, a response to the audio CAPTCHA, and determines whether the response is correct. The device forwards the call to the call center when the response is correct, and drops the call when the response is incorrect.

22 Claims, 7 Drawing Sheets

MITIGATING DENIAL OF SERVICE ATTACKS ON CALL CENTERS

BACKGROUND

Network attacks may include denial of service (DoS) attacks, port scans and network probes to detect and exploit system vulnerabilities, protocol-based attacks on intermediary routing systems, etc. DoS attacks may include overwhelming of a service with traffic in an attempt to prevent legitimate users from using the service. As service providers develop value added revenue sources based on Internet protocol (IP) application services, such as voice-over-IP (VoIP), the open nature of the IP infrastructure may put those revenue sources at risk. Excessive traffic and resource depletion attacks may use either forged or spoofed source addresses or compromised hosts (e.g., VoIP soft clients, botnets, etc.). These mechanisms increase the difficulty in tracing an attack back to the initiator of the attack. Routing protocol-based attacks can be used to compromise legitimate routing and forwarding.

In one example, DoS attacks maliciously target inbound services (e.g., 8XX services, direct dial services, etc.) to disrupt an enterprise call center. VoIP soft clients and/or botnets are scripted for mass calling of a call center, and an originating number is uniquely spoofed for each call. The call volume generated by the mass calling fills network trunks and prevents call center agents from providing service to real clients. Conversions between VoIP networks and the public switched telephone network (PSTN) removes details associated with the calls, which may be helpful for remediation. However, many VoIP carriers that are the sources of such mass calls refuse to investigate or address originators of the mass calls. Without the assistance of the VoIP carriers, it may be almost impossible for call center providers to prevent disruptive DoS attacks on call centers.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a mechanism to prevent DoS attacks on call centers when call volumes at the call centers reach a particular threshold level. In one example, the mechanism may include an audio CAPTCHA (Completely Automated Public Turing test to Tell Computer and Humans Apart) that prevents automated DoS calls from reaching call centers. The audio CAPTCHA may provide an audio request to a user of a user device placing a call to a call center, and the user may provide an audio response to the audio request. If the user provides an audio response that satisfies the audio request, the call may be forwarded to the call center. However, if the audio response does not satisfy the audio request, the call may be dropped in order to prevent DoS attacks on the call center. The complexity of the audio CAPTCHA may be carefully balanced so as to have a high pass rate for humans (e.g., users of user devices) and a low pass rate for devices (e.g., computers).

As used herein, the terms "user" and "customer" are intended to be broadly interpreted to include a user device or a user of a user device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
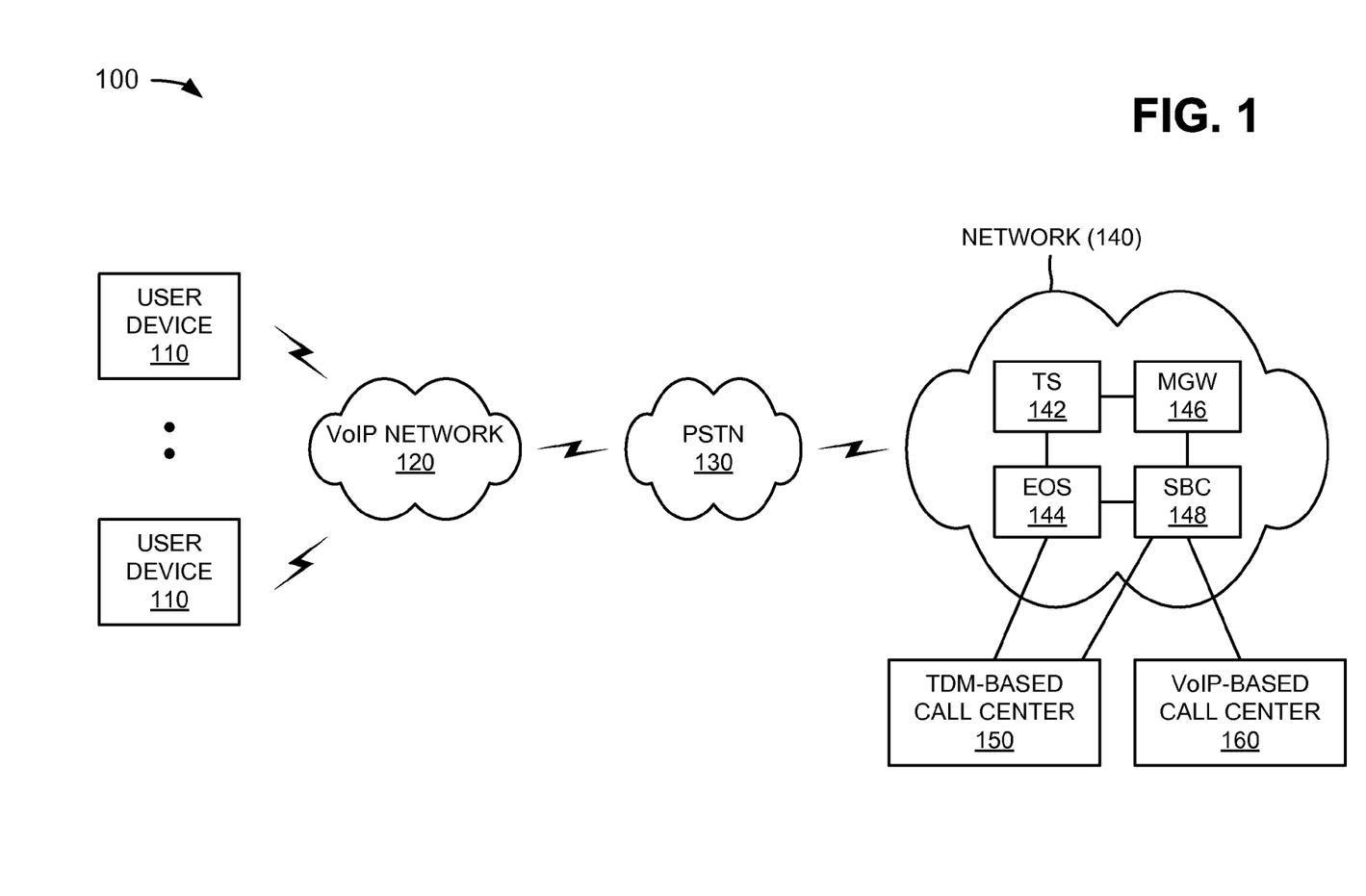
FIG. 1 is a diagram of an example network in which systems and/or methods described herein may be implemented.

FIG. 1 is a diagram of an example network 100 in which systems and/or methods described herein may be implemented. As illustrated, network 100 may include user devices 110, a VoIP network 120, a PSTN 130, a network 140, a time-division multiplexing (TDM)-based call center 150, and a VoIP-based call center 160. Network 140 may include a tandem switch (TS) 142, an end office switch (EOS) 144, a media gateway (MGW) 146, and a session border controller (SBC) 148. Devices and/or networks of network 100 may interconnect via wired and/or wireless connections. Two user devices 110, one VoIP network 120, one PSTN 130, one network 140, one TS 142, one EOS 144, one MGW 146, one SBC 148, one TDM-based call center 150, and one VoIP-based call center 160 have been illustrated in FIG. 1 for simplicity. In practice, there may be more user devices 110, VoIP networks 120, PSTNs 130, networks 140, TSs 142, EOSs 144, MGWs 146, SBCs 148, TDM-based call centers 150, and/or VoIP-based call centers 160.

User device 110 may include a radiotelephone; a personal communications system (PCS) terminal, that may, for example, combine a cellular radiotelephone with data processing and data communications capabilities; a wireless telephone; a cellular telephone; a smart phone; a personal digital assistant (PDA) that can include, for example, a radiotelephone, a pager, Internet/intranet access, etc.; a laptop computer; a tablet computer; a desktop computer; a workstation computer; a server device; or other types of computation and communication devices. In one example, user device 110 may include a device that is capable of communicating with TDM-based call center 150 and/or VoIP-based call center 160 over VoIP network 120, PSTN 130, and/or network 140.

VoIP network 120 may include an IP-based network, a packet-switched network, or a combination of networks that enable the delivery of voice communications and multimedia sessions. In one example, VoIP network 120 may enable VoIP telephone calls from user devices 110 to be provided to VoIP-based call center 160. In order to originate a VoIP telephone call, user device 110 may set up a signaling/media channel, may digitize the analog voice signal, may encode the digitized voice signal, may packetize the digitized voice signal, and may transmit the packet over VoIP network 120.

PSTN 130 may include a network of public circuit-switched telephone networks. PSTN 130 may include telephone lines, fiber optic cables, microwave transmission links, cellular networks, communication satellites, telephone cables, etc. interconnected by switching centers, and may allow a telephone to communicate with any other telephone. In one example, PSTN 130 may enable TDM-based telephone calls from user devices 110 to be provided to TDM-based call center 150.

Network 140 may include a local area network (LAN), a wide area network (WAN), a metropolitan area network (MAN), a telephone network, an intranet, the Internet, an optical fiber (or fiber optic)-based network, or a combination of networks.

TS 142 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example implementation, TS 142 may include a device that is specialized for TDM-based, circuit-switched telephone calls. TS 142 may connect a TDM-based call from user device 110 to TDM-based call center 150, via EOS 144. TS 142 may connect a VoIP-based call from user device 110 to VoIP-based call center 160, via MGW 146 and SBC 148.

EOS 144 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, EOS 144 may include a device that is specialized for TDM-based, circuit-switched telephone calls. EOS 144 may connect a TDM-based call from user device 110 to TDM-based call center 150.

MGW 146 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, MGW 146 may include a translation device that converts digital media streams between disparate telecommunications networks such as PSTN 130, a signaling system 7 (SS7) network, etc.

SBC 148 may include one or more computation and communication devices that gather, process, search, and/or provide information in a manner described herein. In one example, SBC 148 may provide control over signaling and media streams involved in setting up, conducting, and tearing down telephone calls or other interactive media communications. In one example implementation, SBC 148 may receive, from user device 110, a call destined for TDM-based call center 150 or VoIP-based call center 160, and may provide an audio CAPTCHA to user device 110. The audio CAPTCHA may provide an audio request to a user of user device 110, and the user may provide an audio response to the audio request. If the user provides an audio response that satisfies the audio request, the call may be forwarded to TDM-based call center 150 or VoIP-based call center 160. However, if the audio response does not satisfy the audio request, the call may be dropped in order to prevent DoS attacks on TDM-based call center 150 or VoIP-based call center 160.

Alternatively, SBC 148 may receive call volume information associated with TDM-based call center 150 or VoIP-based call center 160, and may determine whether the call is eligible for the audio CAPTCHA based on the call volume information. For example, if the call volume information indicates that the call volume at TDM-based call center 150 or VoIP-based call center 160 is greater than a particular threshold (e.g., 60%, 70%, 80%, etc. of the capacity of call centers 150/160), SBC 148 may determine that the call is eligible for the audio CAPTCHA. If SBC 148 determines that the call is not eligible for the audio CAPTCHA, SBC 148 may forward the call to TDM-based call center 150 or VoIP-based call center 160.

TDM-based call center 150 may include one or more computation and communication devices that handle TDM-based or other non-VoIP customer service calls from user devices 110. In one example, TDM-based call center 150 may be operated by a service provider in order to provide product and/or service support or to answer information inquiries from customers. In one example, customer service representatives at TDM-based call center 150 may receive customer service calls, and may address the requests associated with the customer service calls.

VoIP-based call center 160 may include one or more computation and communication devices that handle VoIP-based customer service calls from user devices 110. In one example, VoIP-based call center 160 may be operated by a service provider in order to provide product and/or service support or to answer information inquiries from customers. In one example, customer service representatives at VoIP-based call center 160 may receive customer service calls, and may address the requests associated with the customer service calls.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more tasks described as being performed by one or more other devices/networks of network 100.

Figure 2:
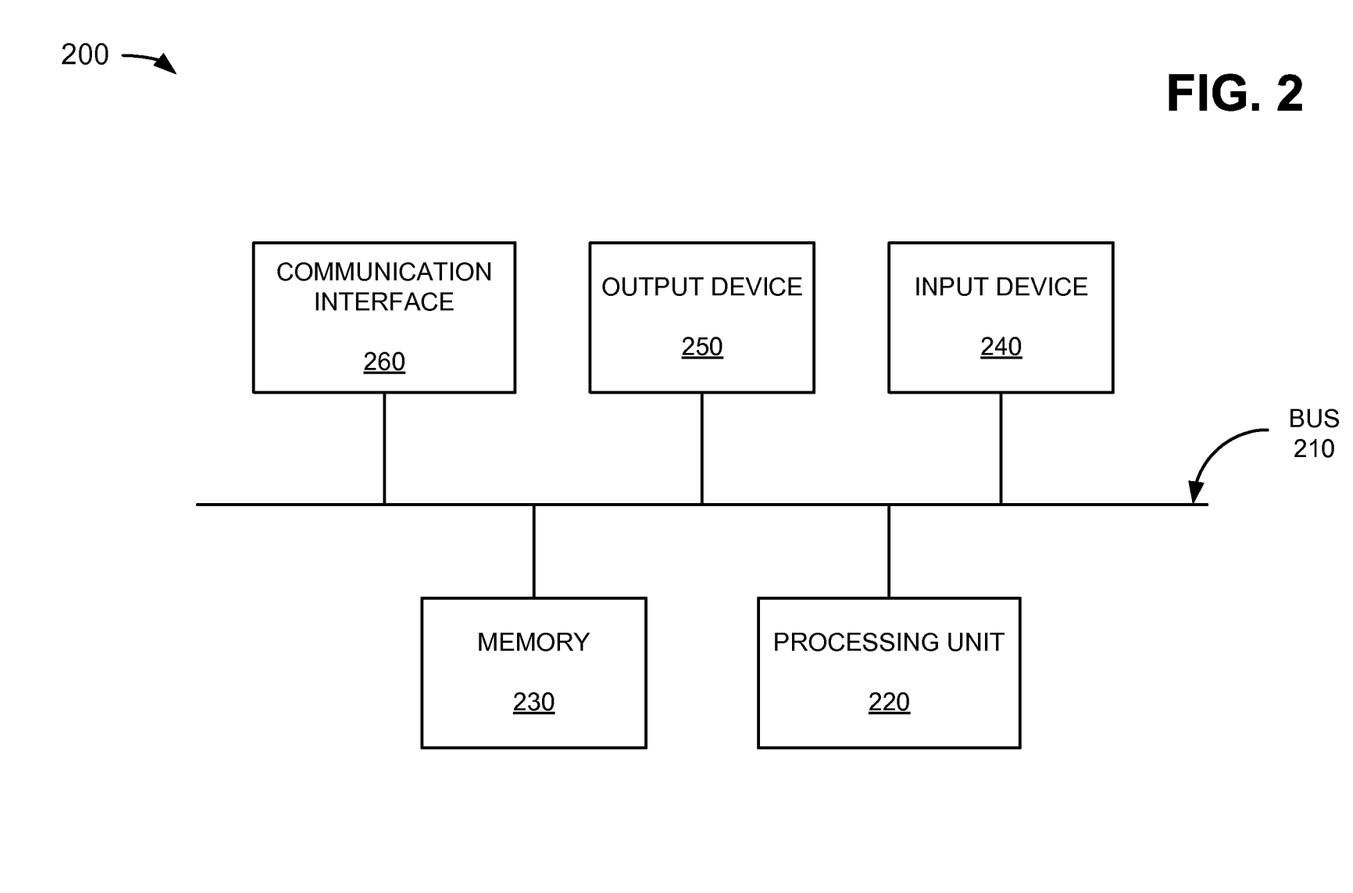
FIG. 2 is a diagram of example components of a device that may correspond to one of the devices of the network depicted in FIG. 1.

FIG. 2 is a diagram of example components of a device 200 that may correspond to one of the devices of network 100. In one example implementation, one or more of the devices of network 100 may include one or more devices 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more tasks described as being performed by one or more other components of device 200.

Figure 3:
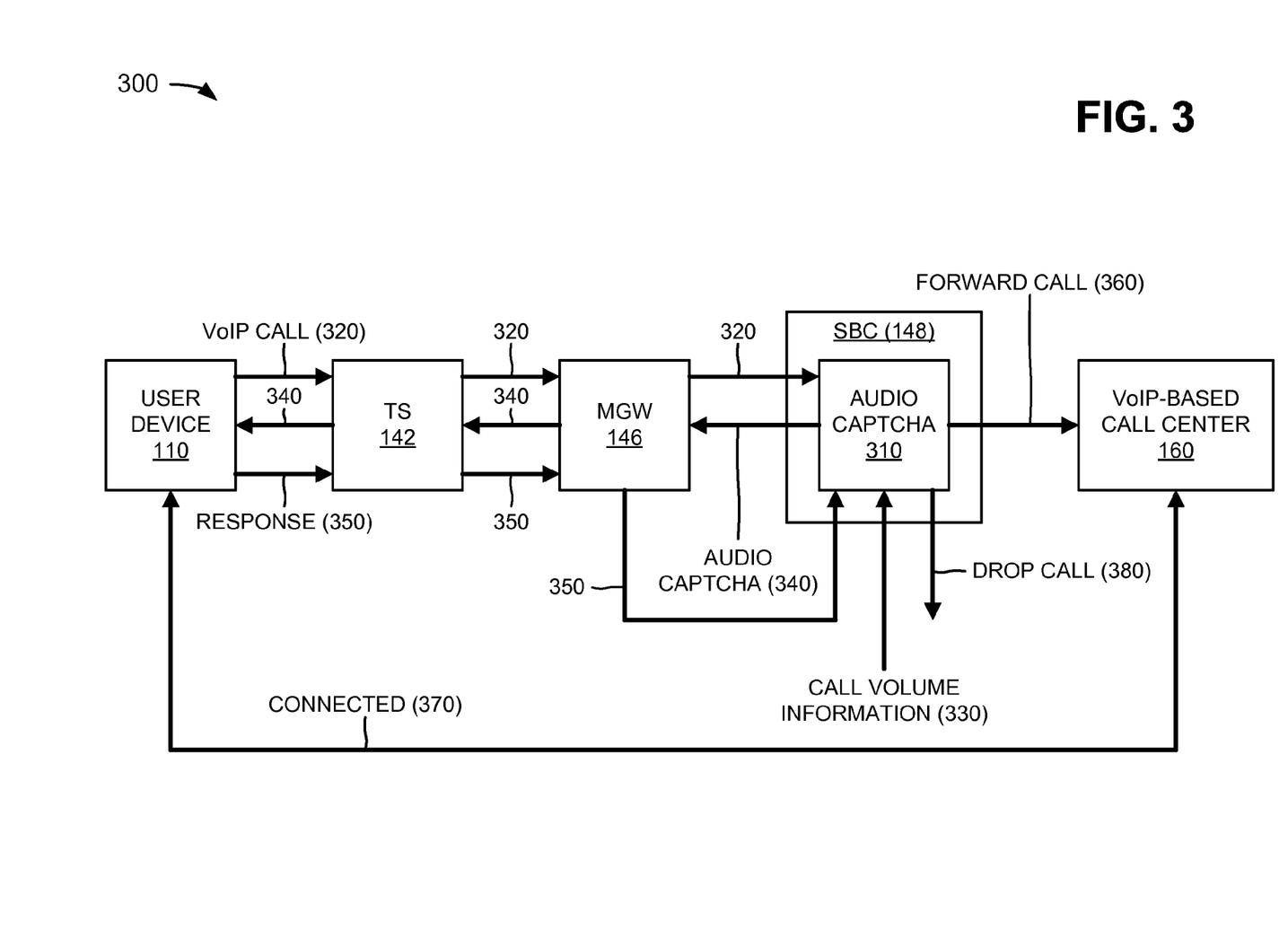
FIG. 3 is a diagram of example operations capable of being performed by an example portion of the network in FIG. 1.

FIG. 3 is a diagram of example operations capable of being performed by an example portion 300 of network 100 (FIG. 1). As shown in FIG. 3, network portion 300 may include user device 110, TS 142, MGW 146, SBC 148, and VoIP-based call center 160. User device 110, TS 142, MGW 146, SBC 148, and VoIP-based call center 160 may include the features described above in connection with, for example, one or more of FIGS. 1 and 2. As further shown in FIG. 3, SBC 148 may include an audio CAPTCHA component 310.

A user of user device 110 may generate a VoIP call 320, and user device 110 may provide VoIP call 320 to TS 142. In one example, VoIP call 320 may include a voice call destined for VoIP-based call center 160. TS 142 may receive VoIP call 320, and may provide VoIP call 320 to MGW 146. MGW 146 may receive VoIP call 320, and may provide VoIP call 320 to audio CAPTCHA component 310 of SBC 148.

Audio CAPTCHA component 310 may receive VoIP call 320 and may receive call volume information 330. Call volume information 330 may include information indicating a volume or a number of calls currently being received by VoIP-based call center 160. In one example implementation, audio CAPTCHA component 310 may verify that a human is generating VoIP call 320 by generating an audio CAPTCHA 340 in response to VoIP call 320. Audio CAPTCHA 340 may include randomized letters, numbers, phrases, etc. that are mixed with noise and/or background voices to prevent voice recognition by devices, such as computers. Similar to visual CAPTCHAs that are used to thwart automated posting or data harvesting on the Internet, audio CAPTCHA 340 may provide an automated approach to mitigating DoS attacks on VoIP-based call center 160. In one example audio CAPTCHA 340 may have a high pass rate for humans and a low pass rate for devices, such as computers.

Alternatively, audio CAPTCHA component 310 may determine whether VoIP call 320 is eligible for audio CAPTCHA 340 based on call volume information 330. If call volume information 330 indicates that the call volume at VoIP-based call center 160 is greater than a particular threshold (e.g., 60%, 70%, 80%, etc. of the capacity of VoIP-based call center 160), audio CAPTCHA component 310 may determine that VoIP call 320 is eligible for audio CAPTCHA 340. If audio CAPTCHA component 310 determines that VoIP call 320 is not eligible for audio CAPTCHA 340, audio CAPTCHA component 310 may forward VoIP call 320 to VoIP-based call center 160, as indicated by reference number 360.

As further shown in FIG. 3, audio CAPTCHA component 310 may provide audio CAPTCHA 340 to MGW 146, and MGW 146 may forward audio CAPTCHA 340 to TS 142. TS 142 may provide audio CAPTCHA 340 to user device 110, and user device 110 may play audio CAPTCHA 340 for a user of user device 110. In one example, audio CAPTCHA 340 may request that the user enter, via a keypad or a touch screen of user device 110, the randomized letters or numbers of audio CAPTCHA 340. Alternatively, audio CAPTCHA 340 may request that the user audibly provide or repeat back, via user device 110, the randomized letters, numbers, phrases, etc. of audio CAPTCHA 340. A response 350 generated by the user may be provided from user device 110 to TS 142, and TS 142 may forward response 350 to MGW 146. MGW 146 may forward response 350 to audio CAPTCHA component 310, and audio CAPTCHA component 310 may receive response 350.

Audio CAPTCHA component 310 may determine whether response 350 includes the information requested by audio CAPTCHA 340. If response 350 includes the information requested by audio CAPTCHA 340, VoIP call 320 may be forwarded to VoIP-based call center 160, as indicated by reference number 360. Once VoIP call 320 is received by VoIP-based call center 160, user device 110 may be connected to VoIP-based call center 160, as indicated by reference number 370. However, if response 350 does not include the information requested by audio CAPTCHA 340, VoIP call 320 may be dropped in order to prevent DoS attacks on VoIP-based call center 160, as indicated by reference number 380. Alternatively, if response 350 does not include the information requested by audio CAPTCHA 340, audio CAPTCHA component 310 may provide another audio CAPTCHA to user device 110. In one example, audio CAPTCHA component 310 may retry different audio CAPTCHAs for a particular number of times (e.g., two times, three times, etc.) before dropping VoIP call 320.

Although FIG. 3 show example components of network portion 300, in other implementations, network portion 300 may include fewer components, different components, differently arranged components, or additional components than depicted in FIG. 3. Additionally, or alternatively, one or more components of network portion 300 may perform one or more tasks described as being performed by one or more other components of network portion 300. For example, audio CAPTCHA component 310 may be provided in VoIP-based call center 160 instead of in SBC 148.

Figure 4:
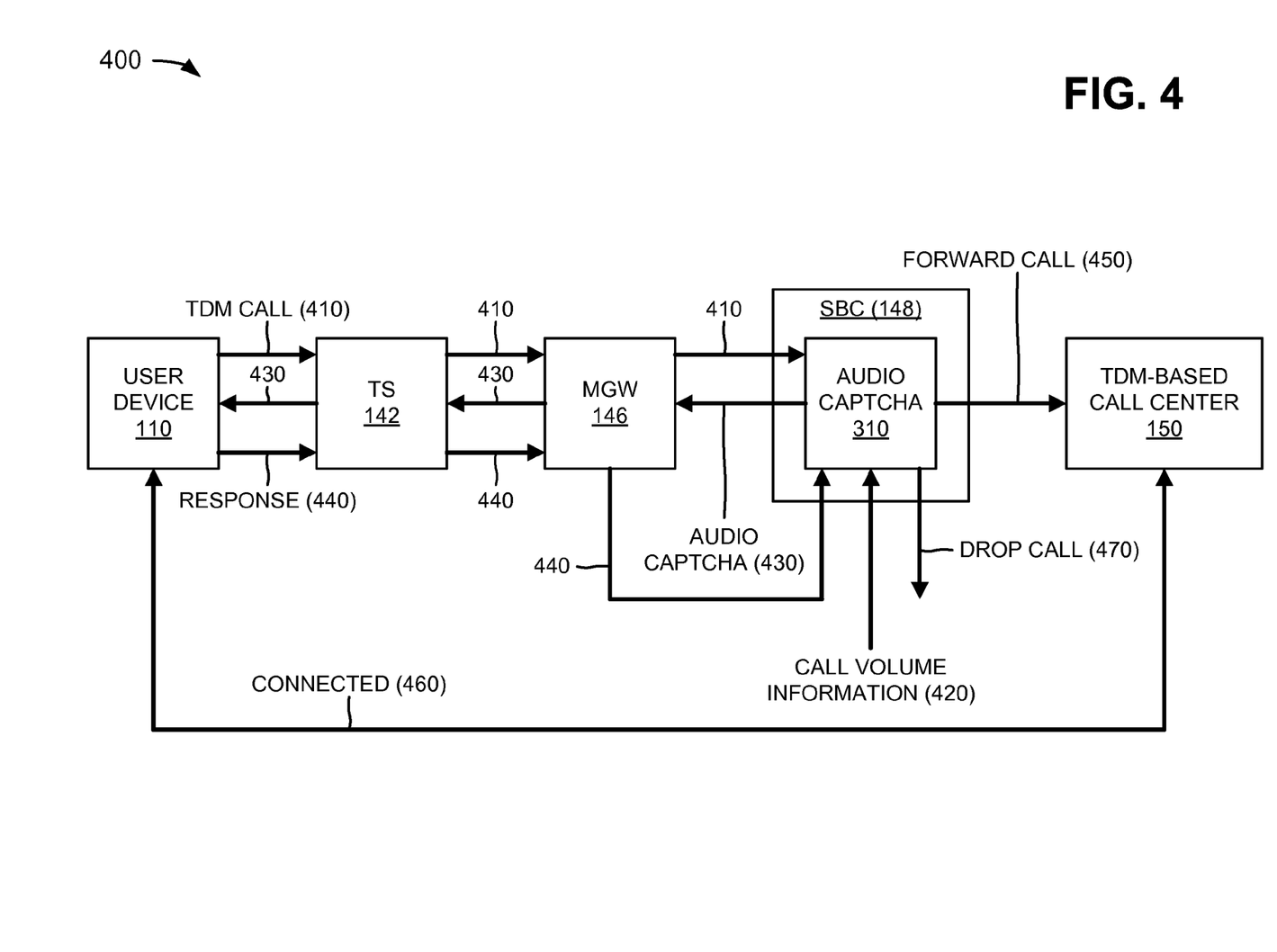
FIG. 4 is a diagram of example operations capable of being performed by another example portion of the network in FIG. 1.

FIG. 4 is a diagram of example operations capable of being performed by another example portion 400 of network 100 (FIG. 1). As shown in FIG. 4, network portion 400 may include user device 110, TS 142, MGW 146, SBC 148, TDM-based call center 150, and audio CAPTCHA component 310. User device 110, TS 142, MGW 146, SBC 148, TDM-based call center 150, and audio CAPTCHA component 310 may include the features described above in connection with, for example, one or more of FIGS. 1-3.

A user of user device 110 may generate a TDM call 410, and user device 110 may provide TDM call 410 to TS 142. In one example, TDM call 410 may include a voice call destined for TDM-based call center 150. TS 142 may receive TDM call 410, and may provide TDM call 410 to MGW 146. MGW 146 may receive TDM call 410, and may provide TDM call 410 to audio CAPTCHA component 310 of SBC 148.

Audio CAPTCHA component 310 may receive TDM call 410 and may receive call volume information 420. Call volume information 420 may include information indicating a volume or a number of calls currently being received by TDM-based call center 150. In one example implementation, audio CAPTCHA component 310 may verify that a human is generating TDM call 410 by generating an audio CAPTCHA 430 in response to VoIP call 320. Audio CAPTCHA 430 may include the features described above in connection with audio CAPTCHA 340.

Alternatively, audio CAPTCHA component 310 may determine whether TDM call 410 is eligible for audio CAPTCHA 430 based on call volume information 420. If call volume information 420 indicates that the call volume at TDM-based call center 150 is greater than a particular threshold (e.g., 70%, 80%, 90%, etc. of the capacity of TDM-based call center 150), audio CAPTCHA component 310 may determine that TDM call 410 is eligible for audio CAPTCHA 430. If audio CAPTCHA component 310 determines that TDM call 410 is not eligible for audio CAPTCHA 430, audio CAPTCHA component 310 may forward TDM call 410 to TDM-based call center 150, as indicated by reference number 450.

As further shown in FIG. 4, audio CAPTCHA component 310 may provide audio CAPTCHA 430 to MGW 146, and MGW 146 may forward audio CAPTCHA 430 to TS 142. TS 142 may provide audio CAPTCHA 430 to user device 110, and user device 110 may play audio CAPTCHA 430 for a user of user device 110. In one example, audio CAPTCHA 430 may request that the user enter, via user device 110, the randomized letters or numbers of audio CAPTCHA 430. Alternatively, audio CAPTCHA 430 may request that the user audibly provide or repeat back, via user device 110, the randomized letters, numbers, phrases, etc. of audio CAPTCHA 430. A response 440 generated by the user may be provided from user device 110 to TS 142, and TS 142 may forward response 440 to MGW 146. MGW 146 may forward response 440 to audio CAPTCHA component 310, and audio CAPTCHA component 310 may receive response 440.

Audio CAPTCHA component 310 may determine whether response 440 includes the information requested by audio CAPTCHA 430. If response 440 includes the information requested by audio CAPTCHA 430, TDM call 410 may be forwarded to TDM-based call center 150, as indicated by reference number 450. Once TDM call 410 is received by TDM-based call center 150, user device 110 may be connected to TDM-based call center 150, as indicated by reference number 460. However, if response 440 does not include the information requested by audio CAPTCHA 430, TDM call 410 may be dropped in order to prevent DoS attacks on TDM-based call center 150, as indicated by reference number 470. Alternatively, if response 440 does not include the information requested by audio CAPTCHA 430, audio CAPTCHA component 310 may provide another audio CAPTCHA to user device 110. In one example, audio CAPTCHA component 310 may retry different audio CAPTCHAs for a particular number of times (e.g., two times, three times, etc.) before dropping TDM call 410.

Although FIG. 4 show example components of network portion 400, in other implementations, network portion 400 may include fewer components, different components, differently arranged components, or additional components than depicted in FIG. 4. Additionally, or alternatively, one or more components of network portion 400 may perform one or more tasks described as being performed by one or more other components of network portion 400. For example, audio CAPTCHA component 310 may be provided in TDM-based call center 150 instead of in SBC 148.

Figure 5:
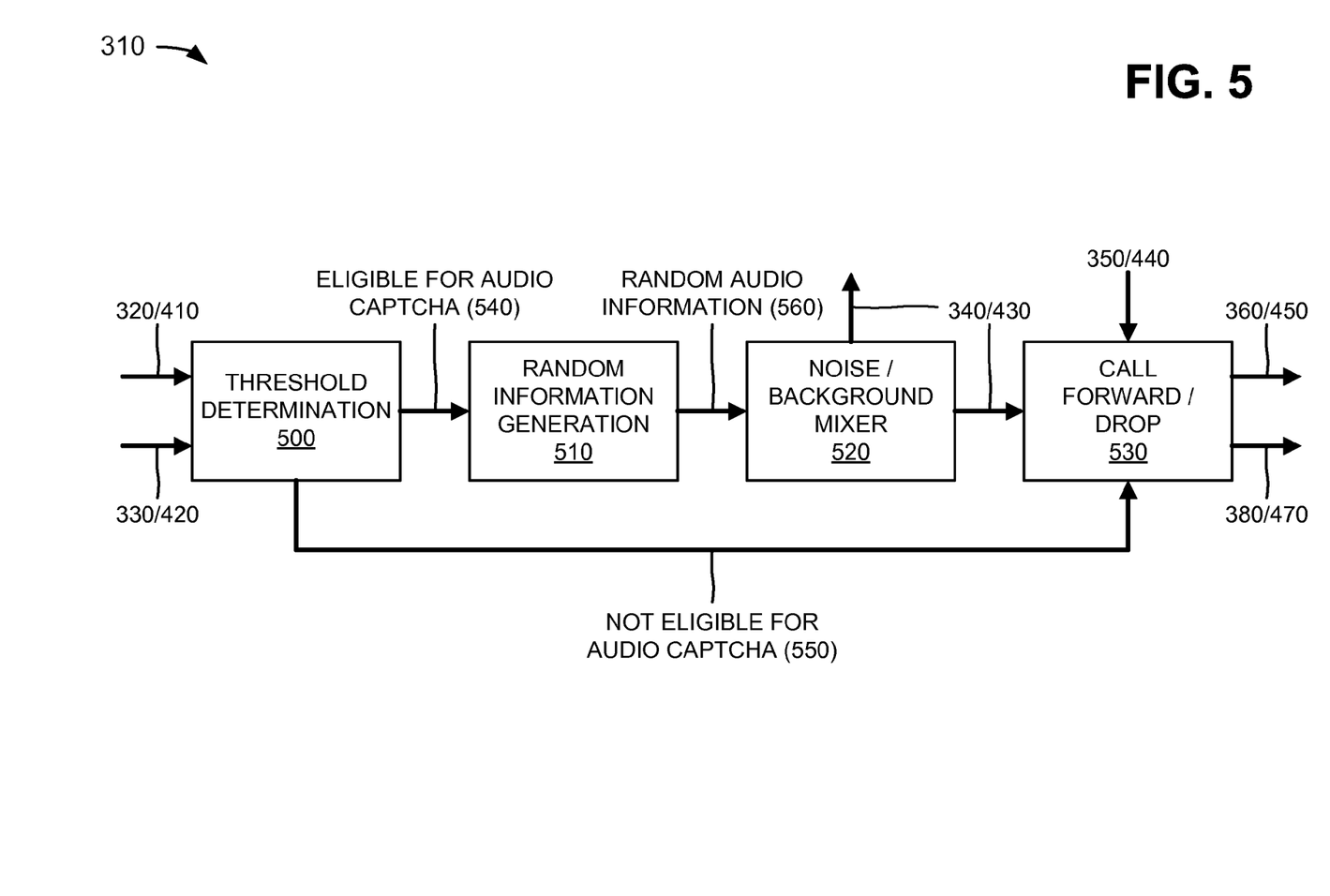
FIG. 5 is a diagram of example functional components of an audio CAPTCHA (Completely Automated Public Turing test to Tell Computer and Humans Apart) component of a session border control (SBC) device depicted in FIGS. 1, 3, and 4.

FIG. 5 is a diagram of example functional components of audio CAPTCHA component 310. In one implementation, the functions described in connection with FIG. 5 may be performed by one or more components of device 200 (FIG. 2) or by one or more devices 200. As shown in FIG. 5, audio CAPTCHA component 310 may include a threshold determination component 500, a random information generation component 510, a noise/background mixer component 520, and a call forward/drop component 530.

Threshold determination component 500 may receive VoIP call 320, call volume information 330, TDM call 410, and/or call volume information 420. In one example, threshold determination component 500 may determine whether VoIP call 320 is eligible for audio CAPTCHA 340 based on call volume information 330. If call volume information 330 indicates that the call volume at VoIP-based call center 160 is greater than a particular threshold (e.g., 60%, 70%, 80%, etc. of the capacity of VoIP-based call center 160), threshold determination component 500 may determine that VoIP call 320 is eligible for audio CAPTCHA 340, and may provide, to random information generation component 510, an indication 540 that VoIP call 320 is eligible for audio CAPTCHA 340. If call volume information 330 indicates that the call volume at VoIP-based call center 160 is less than or equal to the particular threshold, threshold determination component 500 may provide, to call forward/drop component 530, an indication 550 that VoIP call 320 is not eligible for audio CAPTCHA 340.

Alternatively, or additionally, threshold determination component 500 may determine whether TDM call 410 is eligible for audio CAPTCHA 430 based on call volume information 420. If call volume information 420 indicates that the call volume at TDM-based call center 150 is greater than a particular threshold (e.g., 70%, 80%, 90%, etc. of the capacity of TDM-based call center 150), threshold determination component 500 may determine that TDM call 410 is eligible for audio CAPTCHA 430, and may provide, to random information generation component 510, indication 540 that TDM call 410 is eligible for audio CAPTCHA 430. If call volume information 420 indicates that the call volume at TDM-based call center 150 is less than or equal to the particular threshold, threshold determination component 500 may provide, to call forward/drop component 530, indication 550 that TDM call 410 is not eligible for audio CAPTCHA 430.

Random information generation component 510 may receive indication 540 from threshold determination component 500, and may generate random audio information 560 based on indication 540. Random audio information 560 may include an audio file with randomly generated letters, numbers, phrases, etc. and a request to input or repeat (e.g., by a user of user device 110) the randomly generated letters, numbers, phrases, etc. For example, random audio information 560 may include an audio file that states "press 1, 4, and 6 followed by the star button," where the numbers "1, 4, and 6" may be randomly generated each time. As further shown in FIG. 5, random information generation component 510 may provide random audio information 560 to noise/background mixer component 520.

Noise/background mixer component 520 may receive random audio information 560 from random information generation component 510, and may mix noise, background voices, or other sounds with random audio information 560. The mixture of the noise, background voices, or other sounds with random audio information 560 may produce audio CAPTCHA 340 and/or audio CAPTCHA 430. Noise/background mixer component 520 may provide audio CAPTCHA 340/430 to user device 110 (not shown in FIG. 5) and to call forward/drop component 530.

Call forward/drop component 530 may receive indication 550 from threshold determination component 500, and may receive audio CAPTCHA 340/430 from noise/background mixer component 520. If call forward/drop component 530 receives indication 550, call forward/drop component 530 may forward TDM call 320 to TDM-based call center 150 (not shown in FIG. 5), as indicated by reference number 360. Alternatively, if call forward/drop component 530 receives indication 550, call forward/drop component 530 may forward VoIP call 410 to VoIP-based call center 160 (not shown in FIG. 5), as indicated by reference number 450.

As further shown in FIG. 5, call forward/drop component 530 may receive response 350 and/or response 440 from user device 110 (not shown in FIG. 5), and may determine whether response 350 or 440 includes the information requested by audio CAPTCHA 340 or 430, respectively. If response 350 includes the information requested by audio CAPTCHA 340, call forward/drop component 530 may forward VoIP call 320 VoIP-based call center 160 (not shown in FIG. 5), as indicated by reference number 360. However, if response 350 does not include the information requested by audio CAPTCHA 340, call forward/drop component 530 may drop VoIP call 320, as indicated by reference number 380. If response 440 includes the information requested by audio CAPTCHA 430, call forward/drop component 530 may forward TDM call 410 to TDM-based call center 150 (not shown in FIG. 5), as indicated by reference number 450. However, if response 440 does not include the information requested by audio CAPTCHA 430, call forward/drop component 530 may drop TDM call 410, as indicated by reference number 470.

Although FIG. 5 shows example functional components of audio CAPTCHA component 310, in other implementations, audio CAPTCHA component 310 may include fewer functional components, different functional components, differently arranged functional components, or additional functional components than depicted in FIG. 5. Alternatively, or additionally, one or more functional components of audio CAPTCHA component 310 may perform one or more tasks described as being performed by one or more other functional components of audio CAPTCHA component 310.

Figure 6:
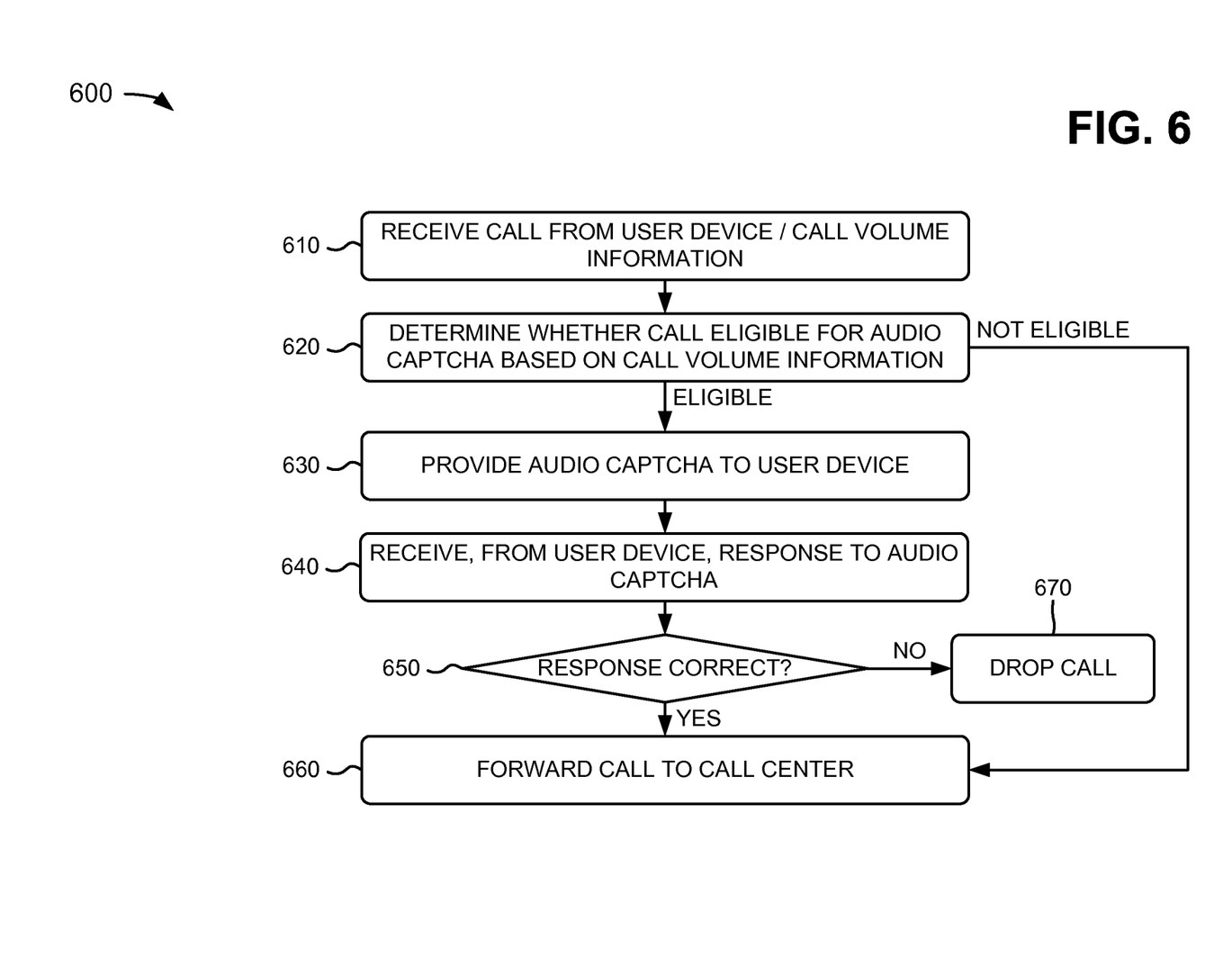
FIGS. 6 and 7 are flow charts of an example process for mitigating denial of service attacks on call centers according to an implementation described herein.
Figure 7:
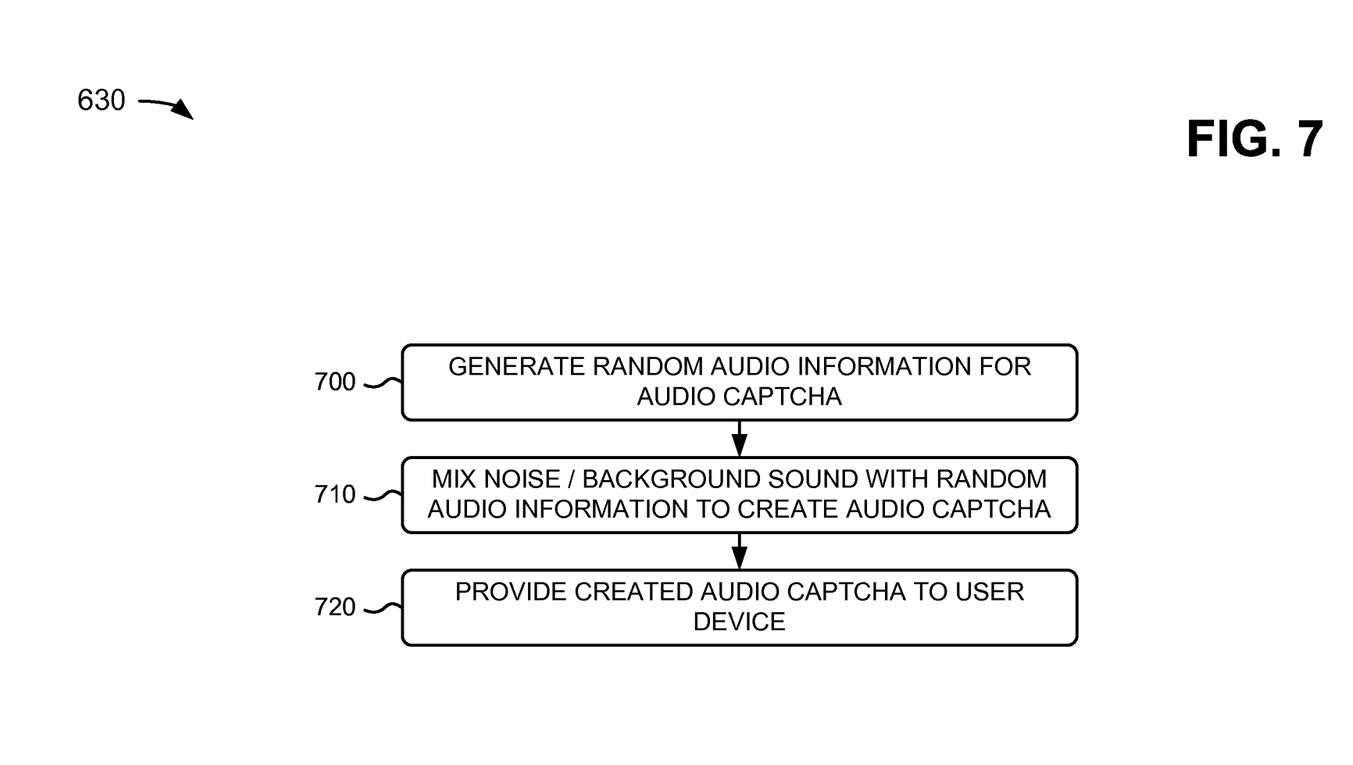

FIGS. 6 and 7 are flow charts of an example process 600 for mitigating denial of service attacks on call centers according to an implementation described herein. In one implementation, process 600 may be performed by audio CAPTCHA component 310 of SBC 148. Alternatively, or additionally, some or all of process 600 may be performed by another device or group of devices, including or excluding audio CAPTCHA component 310 and/or SBC 148.

As shown in FIG. 6, process 600 may include receiving a call from a user device and call volume information (block 610), and determining whether the call is eligible for an audio CAPTCHA based on the call volume information (block 620). For example, in an implementation described above in connection with FIG. 3, audio CAPTCHA component 310 of SBC 148 may receive VoIP call 320 and may receive call volume information 330. Call volume information 330 may include information indicating a volume or a number of calls currently being received by VoIP-based call center 160. Audio CAPTCHA component 310 may determine whether VoIP call 320 is eligible for audio CAPTCHA 340 based on call volume information 330.

As further shown in FIG. 6, if the call is eligible for the audio CAPTCHA (block 620—ELIGIBLE), process 600 may include providing the audio CAPTCHA to the user device (block 630) and receiving, from the user device, a response to the audio CAPTCHA (block 640). For example, in an implementation described above in connection with FIG. 3, if call volume information 330 indicates that the call volume at VoIP-based call center 160 is greater than a particular threshold (e.g., 60%, 70%, 80%, etc. of the capacity of VoIP-based call center 160), audio CAPTCHA component 310 may determine that VoIP call 320 is eligible for audio CAPTCHA 340. Audio CAPTCHA component 310 may provide audio CAPTCHA 340 to MGW 146, and MGW 146 may forward audio CAPTCHA 340 to TS 142. TS 142 may provide audio CAPTCHA 340 to user device 110, and user device 110 may play audio CAPTCHA 340 for a user of user device 110. Response 350 generated by the user may be provided from user device 110 to TS 142, and TS 142 may forward response 350 to MGW 146. MGW 146 may forward response 350 to audio CAPTCHA component 310, and audio CAPTCHA component 310 may receive response 350.

Returning to FIG. 6, if the call is not eligible for the audio CAPTCHA (block 620—NOT ELIGIBLE), process 600 may include forwarding the call to a call center (block 660). For example, in an implementation described above in connection with FIG. 3, if audio CAPTCHA component 310 determines that VoIP call 320 is not eligible for audio CAPTCHA 340, audio CAPTCHA component 310 may forward VoIP call 320 to VoIP-based call center 160, as indicated by reference number 360.

As further shown in FIG. 6, process 600 may include determining whether the response is correct (block 650). If the response is correct (block 650—YES), process 600 may include forwarding the call to the call center (block 660). If the response is incorrect (block 650—NO), process 600 may include dropping the call (block 670). For example, in an implementation described above in connection with FIG. 3, audio CAPTCHA component 310 may determine whether response 350 includes the information requested by audio CAPTCHA 340. If response 350 includes the information requested by audio CAPTCHA 340, VoIP call 320 may be forwarded to VoIP-based call center 160, as indicated by reference number 360. However, if response 350 does not include the information requested by audio CAPTCHA 340, VoIP call 320 may be dropped, as indicated by reference number 380.

Process block 630 may include the process blocks depicted in FIG. 7. As shown in FIG. 7, process block 630 may include generating random audio information for the audio CAPTCHA (block 700), mixing noise and/or background sound with the random audio information to create the audio CAPTCHA (block 710), and providing the created audio CAPTCHA to the user device (block 720). For example, in an implementation described above in connection with FIG. 5, random information generation component 510 may receive indication 540 from threshold determination component 500, and may generate random audio information 560 based on indication 540. Random audio information 560 may include an audio file with randomly generated letters, numbers, phrases, etc. and a request to input or repeat (e.g., by a user of user device 110) the randomly generated letters, numbers, phrases, etc. Random information generation component 510 may provide random audio information 560 to noise/background mixer component 520. Noise/background mixer component 520 may receive random audio information 560 from random information generation component 510, and may mix noise, background voices, or other sounds with random audio information 560. The mixture of the noise, background voices, or other sounds with random audio information 560 may produce audio CAPTCHA 340/430. Noise/background mixer component 520 may provide audio CAPTCHA 340/430 to user device 110.

Systems and/or methods described herein may provide a mechanism to prevent DoS attacks on call centers when call volumes at the call centers reach a particular threshold level. In one example, the mechanism may include an audio CAPTCHA that prevents automated DoS calls from reaching call centers. The audio CAPTCHA may provide an audio request to a user of a user device placing a call to a call center, and the user may provide an audio response to the audio request. If the user provides an audio response that satisfies the audio request, the call may be forwarded to the call center. However, if the audio response does not satisfy the audio request, the call may be dropped in order to prevent DoS attacks on the call center. The complexity of the audio CAPTCHA may be carefully balanced so as to have a high pass rate for humans (e.g., users of user devices) and a low pass rate for devices (e.g., computers).

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the possible implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
  receiving, by a device and from a user device, a call destined for a call center;
  receiving, by the device, call volume information associated with the call center;
  determining, by the device, whether to apply an audio CAPTCHA (Completely Automated Public Turing test to Tell Computer and Humans Apart) to the call based on the call volume information;
  generating the audio CAPTCHA in response to determining to apply the audio CAPTCHA to the call;
  providing, by the device, the audio CAPTCHA to the user device in response to determining to apply the audio CAPTCHA to the call;
  receiving, by the device and from the user device, a response to the audio CAPTCHA;
  determining, by the device, whether the response is correct;
  forwarding, by the device, the call to the call center in response to determining that the response is correct; and
  dropping, by the device, the call in response to determining that the response is incorrect.

2. The method of claim 1, further comprising:
  forwarding the call to the call center without generating the audio CAPTCHA, in response to determining not to apply the audio CAPTCHA to the call.

3. The method of claim 1, where the device includes a session border controller (SBC) device.

4. The method of claim 1, where the call includes a voice over Internet protocol (VoIP) call and the call center includes a VoIP-based call center.

5. The method of claim 1, where the call includes a time-division multiplexing (TDM) call and the call center includes a TDM-based call center.

6. The method of claim 1, further comprising:
  providing another audio CAPTCHA to the user device prior to dropping the call;
  receiving, from the user device, another response to the other audio CAPTCHA;
  determining whether the other response is correct; and
  forwarding the call to the call center in response to determining that the other response is correct.

7. The method of claim 6, further comprising:
  dropping the call in response to determining that the other response is incorrect.

8. The method of claim 1, where providing the audio CAPTCHA to the user device further comprises:
  generating random audio information for the audio CAPTCHA;
  mixing noise or background sound with the random audio information to create the audio CAPTCHA; and
  providing the created audio CAPTCHA to the user device.

9. A device, comprising:
  a processor to:
    receive, from a user device, a call destined for a call center,
    receive call volume information associated with the call center,
    determine whether to apply an audio CAPTCHA (Completely Automated Public Turing test to Tell Computer and Humans Apart) to the call based on the call volume information,
    provide the audio CAPTCHA to the user device in response to determining to apply the audio CAPTCHA to the call,
    receive, from the user device, a response to the audio CAPTCHA,
    determine whether the response is correct,
    forward the call to the call center in response to determining that the response is correct, and
    drop the call in response to determining that the response is incorrect.

10. The device of claim 9, where the call includes a voice over Internet protocol (VoIP) call and the call center includes a VoIP-based call center.

11. The device of claim 9, where the call includes a non-voice over Internet protocol (VoIP) call and the call center includes a non VoIP-based call center.

12. The device of claim 9, where the processor is further to:
provide another audio CAPTCHA to the user device prior to dropping the call,
receive, from the user device, another response to the other audio CAPTCHA,
determine whether the other response is correct, and
forward the call to the call center in response to determining that the other response is correct.

13. The device of claim 12, where the processor is further to:
drop the call in response to determining that the other response is incorrect.

14. The device of claim 9, where, when providing the audio CAPTCHA to the user device, the processor is further to:
generate random audio information for the audio CAPTCHA,
mix noise or background sound with the random audio information to create the audio CAPTCHA, and
provide the created audio CAPTCHA to the user device.

15. A non-transitory computer-readable medium, comprising:
one or more instructions that, when executed by a processor of a device, cause the processor to:
receive, from a user device, a call destined for a call center,
receive call volume information associated with the call center,
determine whether to apply an audio CAPTCHA (Completely Automated Public Turing test to Tell Computer and Humans Apart) to the call based on the call volume information,
provide the audio CAPTCHA to the user device in response to determining to apply the audio CAPTCHA to the call,
receive, from the user device, a response to the audio CAPTCHA,
determine whether the response is correct,
forward the call to the call center in response to determining that the response is correct, and
drop the call in response to determining that the response is incorrect.

16. The non-transitory computer-readable medium of claim 15, where the call includes a voice over Internet protocol (VoIP) call and the call center includes a VoIP-based call center.

17. The non-transitory computer-readable medium of claim 15, where the call includes a time-division multiplexing (TDM) call and the call center includes a TDM-based call center.

18. The non-transitory computer-readable medium of claim 15, further comprising:
one or more instructions that, when executed by the processor of the device, cause the processor to:
provide another audio CAPTCHA to the user device prior to dropping the call,
receive, from the user device, another response to the other audio CAPTCHA,
determine whether the other response is correct, and
forward the call to the call center in response to determining that the other response is correct.

19. The non-transitory computer-readable medium of claim 18, further comprising:
one or more instructions that, when executed by the processor of the device, cause the processor to:
drop the call in response to determining that the other response is incorrect.

20. The non-transitory computer-readable medium of claim 15, where the audio CAPTCHA includes randomly generated audio information mixed with noise or background sound.

21. The device of claim 9, wherein the processor is further to:
forward the call to the call center without providing the audio CAPTCHA in response to determining not to apply the audio CAPTCHA to the call.

22. The non-transitory computer-readable medium of claim 15, wherein further comprising:
one or more instructions that, when executed by the processor of the device, cause the processor to:
forward the call to the call center without providing the audio CAPTCHA in response to determining not to apply the audio CAPTCHA to the call.

* * * * *